(12) United States Patent
King

(10) Patent No.: US 12,615,326 B1
(45) Date of Patent: Apr. 28, 2026

(54) WALK-WAY LIGHT FOR MOBILE ELECTRONIC DEVICES

(71) Applicant: Justice Faye King, Edmond, OK (US)

(72) Inventor: Justice Faye King, Edmond, OK (US)

(73) Assignees: Justice Faye King; Darren Rice

( * ) Notice: Subject to any disclaimer, the term of this patent is extended or adjusted under 35 U.S.C. 154(b) by 0 days.

(21) Appl. No.: 19/297,910

(22) Filed: Aug. 12, 2025

(51) Int. Cl.
*F21L 4/00* (2006.01)
*H04M 1/22* (2006.01)
*F21Y 115/10* (2016.01)

(52) U.S. Cl.
CPC ................. *H04M 1/22* (2013.01); *F21L 4/00* (2013.01); *F21Y 2115/10* (2016.08)

(58) Field of Classification Search
CPC .......... H04M 1/22; F21Y 2115/10; F21L 4/00
See application file for complete search history.

(56) References Cited

U.S. PATENT DOCUMENTS

| | | | |
|---|---|---|---|
| 8,428,644 B1 | 4/2013 | Harooni | |
| 9,464,796 B2 * | 10/2016 | Shoemake | .......... F21V 33/0052 |
| 11,036,944 B1 | 6/2021 | Feng et al. | |
| 11,449,696 B2 | 9/2022 | Feng et al. | |
| 2004/0136178 A1 * | 7/2004 | Yu | ........................ F21V 21/0885 |
| | | | 362/396 |
| 2005/0128747 A1 | 6/2005 | Tsay | |
| 2005/0285019 A1 | 12/2005 | Chen | |
| 2013/0135871 A1 | 5/2013 | Harooni | |
| 2013/0260825 A1 | 10/2013 | Hagenstad | |
| 2013/0301235 A1 * | 11/2013 | Harooni | .................. G06F 1/166 |
| | | | 362/11 |
| 2016/0109784 A1 | 4/2016 | Xu | |
| 2017/0146890 A1 | 5/2017 | Shoemak et al. | |
| 2019/0121392 A1 * | 4/2019 | Spevak | .................. G03B 15/05 |

* cited by examiner

*Primary Examiner* — Robert J May
(74) *Attorney, Agent, or Firm* — Gugliotta & Gugliotta LPA

(57) ABSTRACT

A walk-way light system for mobile electronic devices provides pathway illumination during voice communications through a light-emitting diode assembly positioned at the bottom edge of the device and configured to project illumination downward toward the ground surface. The system includes a control circuit providing on, off, and strobe functionality with dual activation capability through both automated phone logic and manual switch control. The system integrates with the device's existing power system and enables simultaneous voice communication and pathway illumination functionality while providing emergency signaling capabilities. The invention addresses the directional incompatibility between optimal phone positioning for conversations and effective ground-level illumination for pedestrian safety.

20 Claims, 3 Drawing Sheets

WALK-WAY LIGHT FOR MOBILE ELECTRONIC DEVICES

CROSS-REFERENCE TO RELATED APPLICATIONS

There are no previously filed, nor currently any co-pending applications, anywhere in the world.

BACKGROUND OF THE INVENTION

1. Field of the Invention

The present invention relates generally to mobile device illumination systems and, more particularly, to a downward-facing light assembly integrated at the bottom edge of smartphones that provides pathway illumination during voice communications while enabling dual-mode operation for both navigation assistance and emergency signaling applications.

2. Description of the Related Art

Mobile electronic devices, particularly smartphones, have become ubiquitous tools for communication and navigation in contemporary society. These devices typically incorporate illumination systems primarily designed for photographic enhancement, video recording, and general area lighting applications. Conventional smartphone flashlight implementations position light-emitting diode assemblies at the rear surface of the device, adjacent to camera modules, or integrated within side-mounted configurations. This placement strategy optimizes illumination for image capture scenarios where the device camera faces toward the subject requiring illumination.

The widespread adoption of smartphones as primary communication devices has created usage patterns where individuals frequently engage in voice conversations while simultaneously navigating pedestrian environments during low-light conditions. This dual-functionality requirement exposes fundamental limitations in existing mobile device illumination architectures that were not originally designed to accommodate concurrent communication and pathway lighting needs.

When users attempt to utilize existing smartphone flashlight systems for pathway illumination during voice conversations, several technical and ergonomic challenges emerge. The natural hand positioning required for voice communication orients the device with the earpiece against the user's ear and the microphone near the mouth, creating a substantially vertical device orientation. In this configuration, rear-mounted illumination systems project light horizontally outward rather than downward toward the walking surface, resulting in inadequate ground-level illumination where obstacle detection and path navigation are most critical.

Existing solutions to this problem typically require users to carry separate illumination devices such as traditional flashlights or headlamps, which introduces additional bulk, battery management requirements, and the inconvenience of coordinating multiple devices during ambulatory activities. Alternative approaches involve temporarily suspending phone conversations to reposition the device for illumination purposes, which disrupts communication continuity and creates safety hazards when users must repeatedly shift attention between conversation management and environmental navigation.

The directional mismatch between optimal communication positioning and effective pathway illumination represents a fundamental design conflict that existing mobile device architectures fail to address adequately. Current rear-facing flashlight implementations disperse light in patterns optimized for broad area coverage rather than concentrated downward projection, further reducing their effectiveness for ground-level obstacle identification and path delineation. Consequently, a need has been felt for providing an apparatus and method which enables simultaneous voice communication and pathway illumination without compromising between phone conversation functionality and pedestrian safety.

SUMMARY OF THE INVENTION

It is thus an object of the present invention to provide a downward-facing illumination system for mobile devices that enables simultaneous pathway lighting and voice communication functionality while eliminating the directional incompatibility between optimal phone positioning for conversations and effective ground-level illumination for pedestrian safety.

The present invention provides a system and method for disabling a cell phone while moving. The present invention provides a walk-way light system comprising a high-intensity LED assembly positioned at the bottom edge of a mobile device that projects illumination downward toward the ground surface, enabling continuous pathway visibility during phone conversations through dual activation via either automated phone logic or manual switch control, with integrated strobe functionality for emergency signaling applications.

In preferred embodiments, the inventive method includes: a mobile electronic device incorporating a walk-way light assembly positioned at the bottom edge of the device; a light-emitting diode configured to project illumination downward toward a ground surface; a control circuit providing logic control for the walk-way light including on, off, and strobe effect functionality; a power source connected to the device's existing electrical system; and dual activation capability through both automated phone logic and manual switch operation. Optionally, the system includes multiple illumination modes and integration with device sensors for context-aware activation based on environmental conditions or user activity patterns.

It is an advantage of the present invention that it enables simultaneous voice communication and pathway illumination without requiring users to compromise between phone conversation functionality and pedestrian safety.

It is another advantage of the present invention that the downward-facing light orientation provides optimal ground-level illumination regardless of the device's positioning during phone calls.

It is another advantage of the present invention that it eliminates the need for separate flashlight devices, reducing the burden of carrying multiple illumination tools.

It is another advantage of the present invention that it integrates directly with the device's existing power system through the charging port, eliminating additional battery management requirements.

It is another advantage of the present invention that it provides dual activation methods through both automated phone logic and manual switch control, offering flexibility for different usage scenarios.

It is another advantage of the present invention that the bottom-edge placement prevents accidental obstruction of the light source during normal device handling.

It is another advantage of the present invention that it incorporates emergency strobe functionality, transforming the device into a dual-purpose safety and signaling system.

It is another advantage of the present invention that it maintains the device's original form factor and portability while adding essential illumination capabilities.

It is another advantage of the present invention that it can be manufactured using readily available components and established production methods, ensuring cost-effective implementation.

It is another advantage of the present invention that it can be adapted for multiple device platforms including Apple, Android, and other smartphone ecosystems.

It is another advantage of the present invention that it reduces the risk of pedestrian accidents by providing consistent pathway visibility during phone conversations.

It is another advantage of the present invention that it enables users to locate small objects such as keys or wallets in low-light conditions while maintaining phone functionality.

It is another advantage of the present invention that the control circuit can interface with existing device sensors to provide automated activation based on environmental conditions or user activity patterns.

It is another advantage of the present invention that it provides high-intensity illumination while maintaining low power consumption to minimize impact on device battery life.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Figure 1:
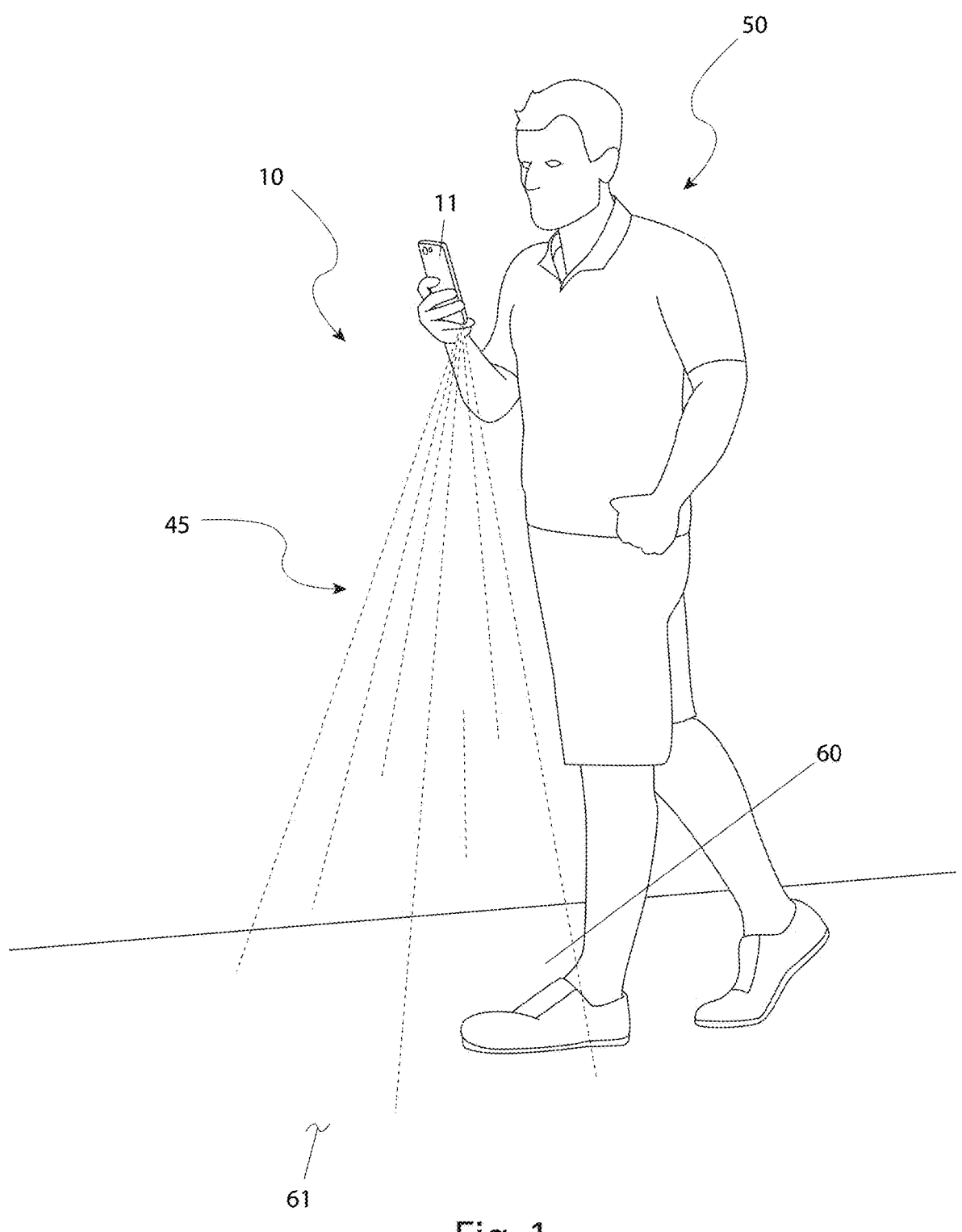
FIG. 1 is an environmental view of a walk-way light 10 integrated within an electronic device 11 and carried by a user 50 that produces illumination 45 directed towards an illumination target 61, according to a preferred embodiment of the present invention.

Referring now to the drawings, wherein like reference numerals indicate the same parts throughout the several views, a walk-away light, generally illustrated as 10, is shown according to the preferred embodiment of the present invention. Referring to FIG. 1, an environmental view of the walk-way light 10 is herein described. The walk-way light 10 provides a dedicated illumination device, such as an LED 40, on a bottom 14 position of an electronic device 11. This position of the walk-way light 10 is specifically designed to provide illumination 45 directed towards an illumination target 60, such as a ground surface 61, that purports to illuminate a walking path of the user 50 as the user 50 is holding the electronic device 11. The orientation of the walkway light 10 of the electronic device 11 produces the illumination 45 to project downward to the illumination target 60 to enhance safety and convenience when the user 50 is walking in dark or dim environments. In current prior art configurations, electronic devices 11 typically have illumination means directing illumination 45 in other directions and therefore, it may be necessary to carry other bulky flashlights to provide the illumination 45 to the desired illumination target 61 when it is down and in front of the user 50. These actions may be seen as unnecessary and possibly unsafe.

Figure 2:
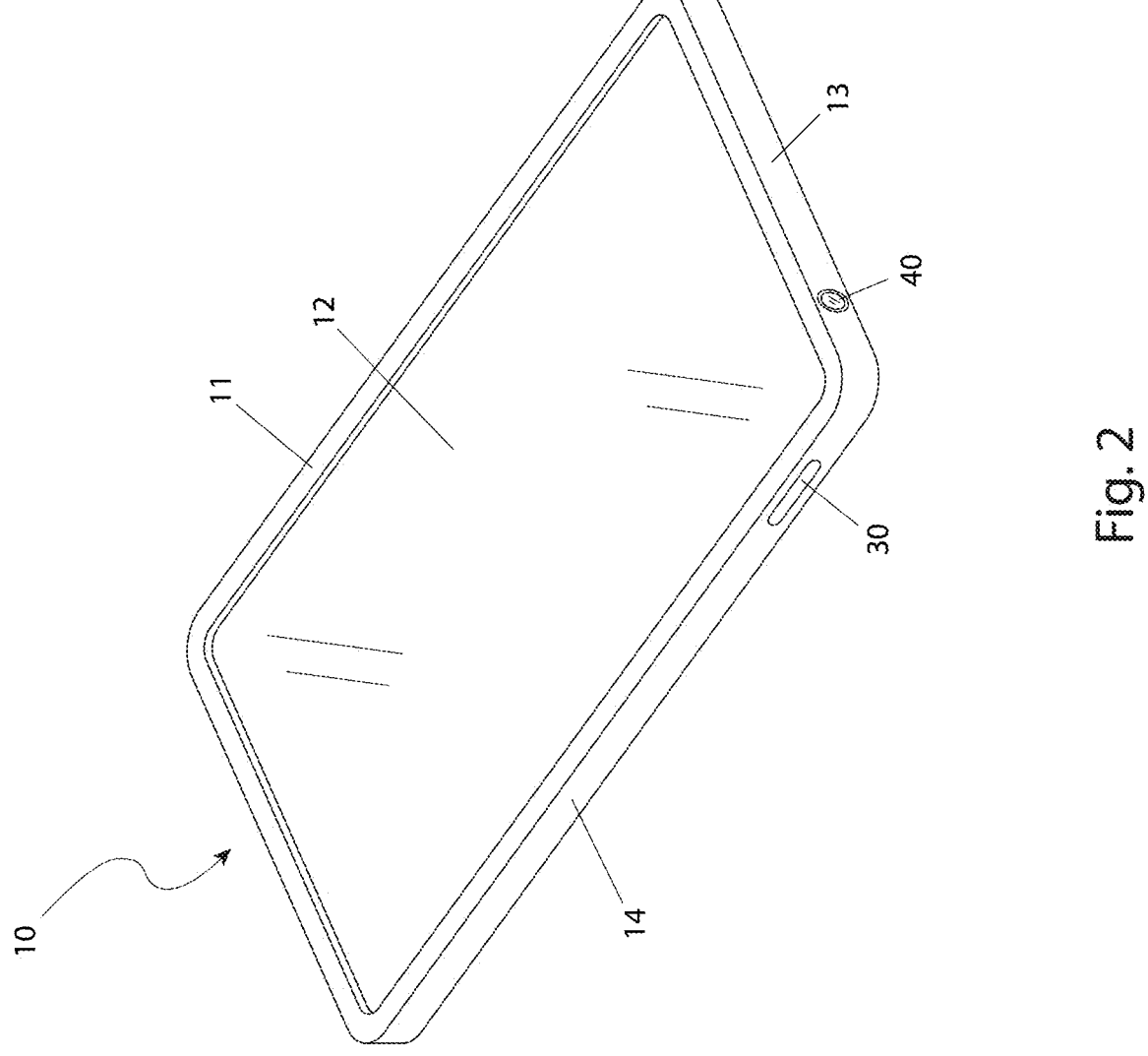
FIG. 2 is an isometric view of the walk-way light 10, according to a preferred embodiment of the present invention; and, FIG. 3 is an electrical schematic of the walk-way light 10, according to the preferred embodiment of the present invention.

FIG. 2 illustrates the walk-way light 10 in an exemplary embodiment in an isometric view. It is appreciated that the walk-way light 10 is best utilized in an electronic device 11 similar to a personal mobile telephone such as those produced by Apple®, Android®, and other makes and models of personal mobile telephones, but it is understood that any type or style of electronic device 10 can fall under the overall scope of the present invention. The walk-way light 10 has an LED 40 installed within a bottom 13 as opposed to a side 14, a top, or a rear of the electronic device 11, ensuring that it conveniently directs illumination 45 towards the intended illumination target 61, which is downwards, as the user 50 travels with the electronic device 11. On a side 14 of the electronic device 11, a switch 30 is located that activates the LED 40. In a preferred embodiment, the switch 30 may be a pushbutton in a similar size and style as any other activation pushbuttons that operate other existing features of the electronic device 11. Also in the preferred embodiment, the switch 30 is located near the bottom 13 and in the general vicinity of the LED 40. The location of the LED 40 at the bottom 13 of the electronic device 10 is intended to greatly reduce or eliminate any accidental or inadvertent activation of other buttons that may interfere with the LED 40.

Figure 3:
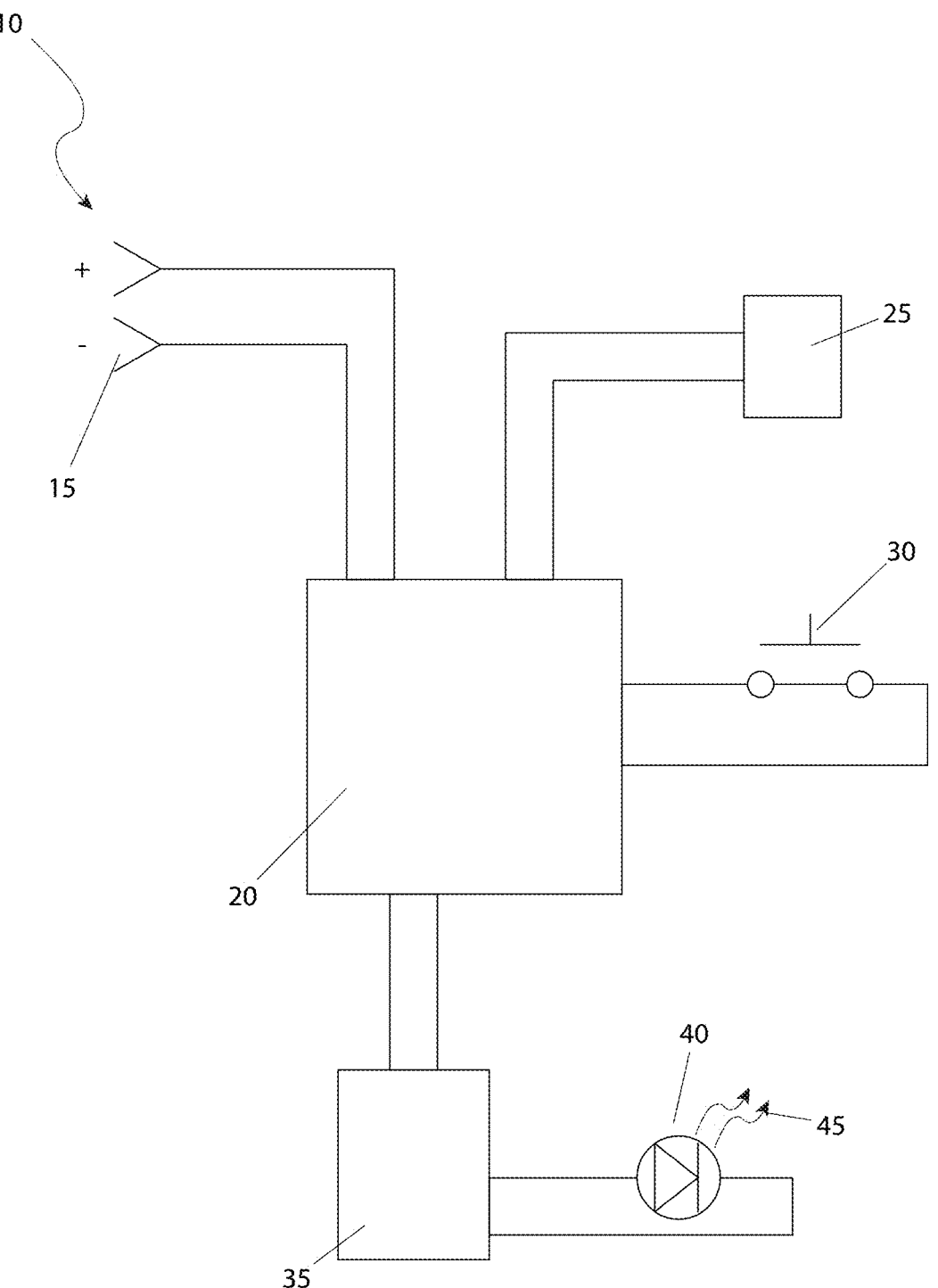

Referring now to FIG. 3, an electrical schematic of the walk-way light 10, is herein described. Power for the walk-way light 10 is provided by a power source 15, envisioned to be the battery as is typically used by the electronic device 11. As such, the power source 15 would be charged whenever the electronic device 11 is charged. Power then flows to a control circuit 20 which provides logic control for the walk-way light 10. Functionality such as on, off, and strobe effect would be provided. The strobe feature, provided by the control circuit 20, causes a flashing light effect. This functionality may be used in case of emergency situations. The strobe feature will give the benefit of being identified more quickly than continuous illumination 45 due to the strobe effect that will draw attention to where you are when in a dark place.

2. Operation of the Preferred Embodiment

Actuation of the walk-way light 10 would be provided by one (1) of two (2) sources. A first activation would be through phone logic 25 as controlled by a dedication application running on the electronic device 11, which may be controlled by various functions within the electronic device 11 such as location, time, brightness levels, activity levels or the like. The use of any specific manual or automatic control is not intended to be a limiting factor of the walk-way light 10. A second activation would be the switch 30, which is manually operated as a momentary source (i.e., the switch 30 may be pressed once to turn on and a subsequent press to turn off). The phone logic 25 and/or the switch 30 may be used concurrently (i.e., the first activation by the phone logic 25 may be used to activate the walk-way light 10, and the second activation by the switch 30 may be used to deactivate the walk-way light 10), or independently. The output of the control circuit 20 is used to drive an LED drive 35 which in turn is used to drive the LED 40. The LED 40 is envisioned to be a high intensity light-emitting diode with a low power draw.

In alternative embodiments, the walk-way light 10 may incorporate multiple LED elements arranged in an array configuration to provide enhanced illumination coverage or variable beam patterns. The LED array may include different color temperatures or wavelengths to optimize visibility under various environmental conditions, such as fog, rain, or snow.

The control circuit 20 may further include dimming functionality that automatically adjusts the intensity of the LED 40 based on ambient light conditions detected by sensors integrated within the electronic device 11. This adaptive brightness control conserves battery power while maintaining optimal pathway visibility.

The phone logic 25 may be configured to interface with global positioning system (GPS) functionality of the electronic device 11 to provide location-based activation. For example, the walk-way light 10 may automatically activate when the device detects that the user is in a predetermined area known to have inadequate street lighting, such as parks, parking lots, or rural areas.

In certain embodiments, the walk-way light 10 may include a motion sensor that activates illumination when user movement is detected, providing hands-free operation that conserves battery life by only operating when needed for navigation assistance.

The emergency strobe functionality provided by the control circuit 20 may include multiple flash patterns corresponding to different emergency situations, such as medical emergency, security threat, or general distress signals. These patterns may conform to recognized emergency signaling standards to ensure appropriate response from emergency personnel.

The walk-way light 10 housing may be constructed from durable materials such as impact-resistant polycarbonate or aluminum alloy to withstand outdoor environmental conditions and accidental impacts during normal use. Waterproof sealing ensures continued operation in adverse weather conditions.

Integration with the electronic device 11 may include software applications that provide user customization of activation parameters, brightness levels, flash patterns, and automatic activation criteria. The application interface may also provide battery level monitoring specific to the walk-way light 10 system to alert users when illumination functionality may be compromised due to low power conditions.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

The invention claimed is:

1. A walk-way light system for mobile electronic devices comprising:

a mobile electronic device having a bottom edge and configured for voice communication with an earpiece and microphone;

a light-emitting diode assembly positioned at said bottom edge and configured to project illumination downward toward a ground surface at a predetermined angle optimized for pathway illumination during voice communication positioning;

a control circuit operatively connected to said light-emitting diode assembly and configured to provide on, off, and emergency strobe functionality;

dual activation capability including automated phone logic configured to activate said light-emitting diode assembly based on device sensor inputs and a manual switch configured for user-controlled activation;

a power source connected to said mobile electronic device's existing electrical system; and wherein said light-emitting diode assembly maintains downward illumination of said ground surface during voice communication use while eliminating directional incompatibility between optimal phone positioning for conversations and effective ground-level illumination.

2. The walk-way light system of claim 1, wherein said automated phone logic is configured to activate said light-emitting diode assembly based on at least one of: location data, ambient light levels, time of day, and user activity patterns.

3. The walk-way light system of claim 1, wherein said light-emitting diode assembly comprises a high-intensity LED configured for low power consumption to minimize impact on said mobile electronic device's battery life.

4. The walk-way light system of claim 1, wherein said manual switch is positioned on a side surface of said mobile electronic device in proximity to said bottom edge.

5. The walk-way light system of claim 1, wherein said predetermined angle is between 45 and 90 degrees from horizontal to optimize pathway visibility during phone conversations.

6. The walk-way light system of claim 1, wherein said emergency strobe functionality is configured to generate predetermined emergency flash patterns while maintaining voice communication functionality for emergency responders.

7. The walk-way light system of claim 1, wherein said system is configured for integration with multiple mobile device platforms including smartphones and tablets.

8. The walk-way light system of claim 1, wherein said light-emitting diode assembly enables continuous path illumination while said mobile electronic device is held in a voice communication position with said earpiece adjacent to a user's ear.

9. The walk-way light system of claim 1, wherein said system enables simultaneous emergency signaling and voice communication for rescue coordination.

10. A method for providing pathway illumination during mobile device voice communication comprising:

positioning a light-emitting diode assembly at a bottom edge of a mobile electronic device configured for voice communication; configuring said light-emitting diode assembly to project illumination downward toward a ground surface at an angle optimized for pathway visibility during phone conversations;

providing dual activation capability through automated device logic based on sensor inputs and manual user control; integrating said light-emitting diode assembly with said mobile electronic device's existing power system;

maintaining illumination of a walking path while conducting voice communication; and eliminating directional incompatibility between optimal phone positioning for conversations and effective ground-level illumination.

11. The method of claim 10, further comprising providing emergency strobe functionality through a control circuit to generate visual signaling capability while maintaining voice communication functionality.

12. The method of claim 10, wherein said automated device logic activates said light-emitting diode assembly based on at least one of: location data, ambient light levels, time of day, and user activity patterns.

13. The method of claim 10, wherein said angle is between 45 and 90 degrees from horizontal.

14. The method of claim 10, further comprising enabling simultaneous emergency signaling and voice communication for rescue coordination.

15. A mobile electronic device comprising:

a device body having a bottom edge and configured for voice communication with an earpiece and microphone;

a walk-way light assembly integrated at said bottom edge;

said walk-way light assembly including a light-emitting diode oriented to project illumination downward toward a walking path during simultaneous voice communication use;

a control circuit configured to provide on, off, and emergency strobe modes;

dual activation comprising automated phone logic responsive to device sensors and a manual switch; and wherein said walk-way light assembly resolves geometric limitations of conventional mobile device lights by maintaining pathway illumination regardless of voice communication positioning.

16. The mobile electronic device of claim 15, wherein said light-emitting diode projects illumination at a predetermined downward angle between 45 and 90 degrees from horizontal.

17. The mobile electronic device of claim 15, wherein said automated phone logic activates said walk-way light assembly based on environmental conditions including ambient light levels and user activity patterns.

18. The mobile electronic device of claim 15, wherein said emergency strobe modes include predetermined flash patterns for emergency signaling while maintaining voice communication capabilities.

19. The mobile electronic device of claim 15, wherein said walk-way light assembly enables location of small objects during voice communication without disrupting conversation functionality.

20. The mobile electronic device of claim 15, wherein said walk-way light assembly is configured for integration across multiple mobile device platforms including smartphones and tablets.

* * * * *